(12) United States Patent
Borowy et al.

(10) Patent No.: US 7,800,901 B2
(45) Date of Patent: Sep. 21, 2010

(54) POWER SUPPLY COOLING APPARATUS AND CONFIGURATION

(75) Inventors: Dennis M. Borowy, Hanover, NH (US); Michael F. Kornprobst, Lebanon, NH (US); Ronald E. Morris, New London, NH (US)

(73) Assignee: Hypertherm, Inc., Hanover, NH (US)

( * ) Notice: Subject to any disclaimer, the term of this patent is extended or adjusted under 35 U.S.C. 154(b) by 943 days.

(21) Appl. No.: 11/614,543

(22) Filed: Dec. 21, 2006

(65) Prior Publication Data
US 2008/0061048 A1 Mar. 13, 2008

Related U.S. Application Data

(60) Provisional application No. 60/825,510, filed on Sep. 13, 2006, provisional application No. 60/825,515, filed on Sep. 13, 2006, provisional application No. 60/825,520, filed on Sep. 13, 2006.

(51) Int. Cl.
*H05K 7/20* (2006.01)
(52) U.S. Cl. .................. 361/690; 361/695; 361/719; 174/16.1; 174/16.3; 165/80.3; 165/104.33
(58) Field of Classification Search .................. None
See application file for complete search history.

(56) References Cited

U.S. PATENT DOCUMENTS

| | | | |
|---|---|---|---|
| 3,253,646 A | 5/1966 | Koltuniak et al. | |
| 3,592,260 A | 7/1971 | Berger | 165/121 |
| 4,235,495 A | 11/1980 | Propst et al. | |
| 5,297,025 A * | 3/1994 | Shoquist et al. | 361/704 |
| 5,642,260 A | 6/1997 | Sigl | |
| 5,825,642 A | 10/1998 | Ishii et al. | |
| 5,831,240 A * | 11/1998 | Katooka et al. | 219/130.1 |
| 5,886,315 A | 3/1999 | Lu et al. | |
| 6,081,423 A | 6/2000 | Griffin | |
| 6,084,199 A | 7/2000 | Lindsay et al. | |
| 6,131,650 A | 10/2000 | North et al. | |
| 6,400,566 B1 * | 6/2002 | Ootori | 361/695 |
| 6,489,591 B1 * | 12/2002 | Achtner | 219/130.1 |

(Continued)

FOREIGN PATENT DOCUMENTS

DE 1 538 199 3/1971

(Continued)

OTHER PUBLICATIONS

Hypertherm® POWERMAX1650® G3 Series™ brochure, Part No. 860260, Revision 3, Apr. 2005, Hypertherm, Inc.

(Continued)

*Primary Examiner*—Boris L Chervinsky
(74) *Attorney, Agent, or Firm*—Proskauer Rose, LLP (57) ABSTRACT

An improved system for cooling a power supply of a welding or plasma cutting system, and an improved configuration of a power supply. The system cools achieves the improvement in configuration and cooling by mounting electrical components to a circuit board and then to a heat sink. Electrical components are also mounted to a common panel that improves the circulation of air. A central panel supporting the power supply heat sink and components allows a smaller and more compact design while maintaining proper temperatures. Electromagnet cooling is improved by modifying electromagnetic cores to conduct heat to the heat sink, and by the use of thermally conducting polymers.

14 Claims, 7 Drawing Sheets

U.S. PATENT DOCUMENTS

| | | | |
|---|---|---|---|
| 6,665,183 B1 * | 12/2003 | Shikata et al. | 361/697 |
| 6,803,541 B2 | 10/2004 | Andersen et al. | |
| 6,831,838 B1 * | 12/2004 | Boyce | 361/719 |
| 6,863,045 B2 | 3/2005 | Ricordi | |
| 6,888,099 B1 | 5/2005 | Schneider | |
| 6,930,883 B2 * | 8/2005 | Hsieh et al. | 361/695 |
| 6,960,842 B2 * | 11/2005 | Ziegler et al. | 307/64 |
| 6,993,918 B1 | 2/2006 | Cowans | |
| 7,005,609 B2 | 2/2006 | Andersen et al. | |
| 7,154,755 B2 * | 12/2006 | Araujo | 361/720 |
| 7,265,985 B2 * | 9/2007 | Widmayer et al. | 361/721 |
| 7,326,879 B2 * | 2/2008 | Andersen et al. | 219/130.1 |
| 2005/0029241 A1 | 2/2005 | Spear | 219/130.1 |

FOREIGN PATENT DOCUMENTS

EP          0 900 621          3/1999

OTHER PUBLICATIONS

Hypertherm® POWERMAX1250® G3 Series™ brochure, Part No. 860110, Revision 7, Nov. 2005, Hypertherm, Inc.
Hypertherm® POWERMAX 1000® G3 Series™ brochure, Part No. 860240, Revision 0, Sep. 2001, Hypertherm, Inc.
Hypertherm® Manual Plasma Cutting Systems brochure, Part No. 860200, Revision 5, Sep. 2005, Hypertherm, Inc.
Hypertherm® POWERMAX1000® Plasma Arc Cutting System Service Manual, Part No. 804300, Revision 1, May 2006, Hypertherm, Inc.

* cited by examiner

POWER SUPPLY COOLING APPARATUS AND CONFIGURATION

RELATED APPLICATIONS

This application claims benefit of priority to U.S. Provisional Patent Application Nos. 60/825,510, 60/825,515, and 60/825,520, all filed Sep. 13, 2006, which are incorporated by reference in there entirety. This application also relates to two co-pending applications.

FIELD OF THE INVENTION

The invention generally relates to the field of power supplies used with plasma arc torch systems and processes. More specifically, the invention relates to the cooling system used in a power supply, and the configuration of the components of a power supply.

BACKGROUND OF THE INVENTION

Common welding-type power supplies used in high temperature metal processing systems such as welding or plasma cutting systems generally include a power supply connected by a cable to a torch at which the welding or cutting operation takes place. In manual, hand-operated systems the torch is typically contained in an insulated handle that is held and guided by an operator. In automated systems, the movement of the torch is typically performed using a cutting table that is controlled by a computer using CNC. In both manual and automated systems, the torch is detachably connected to the cable, and the cable is detachably connected to the power supply. Depending on the system performance desired for a particular welding or cutting operation, the system can be assembled from various combinations of power supply, cable, and torch. Common performance factors considered when selecting a power supply include the costs of purchase, operation, and maintenance of the power supply, the ability of power supply to remain within an operational temperature range, the mobility of the power supply, and the environment in which the power supply will be used.

A significant factor in the selection of a power supply is the cost relating to the purchase, operation, and maintenance of the power supply. The purchase price and repair costs are in part related to the effort required to assemble and disassemble the power supply. Maintenance costs are also increased because the time required for repair is unduly long, as increased repair costs reflect a greater amount of labor, and because of the extended down time during which the power supply is not available for service. The operational costs are also affected by the efficiency of the power supply, which is degraded, for example, when the power supply operates at an excessively elevated temperature. It is therefore desirable that the power supply operate efficiently at low operational cost while also being affordable to purchase and maintain.

Another factor considered in the selection of a welding-type power supply is the ability of the device to remove heat generated by internal components. Due to the large amounts of power handled by the power supply, internal transformers, resistors, and other heat-generation components raise the overall temperature of the power supply. Excessive heat in the power supply can lead to component damage, reduced efficiency of the system, and the tripping of temperature sensors that limit duty cycle. These conditions represent failures of the power supply because the device is no longer operational until repaired or sufficiently cooled and reset, or limits operating time until components are cooled and reset. Such outages represent lost shop time and adversely affect efficiencies and throughput capacities.

Many common power supplies utilize a forced-air cooling system to cool internal components. However, existing forced-air cooling systems require a power supply layout in which the heat-generating parts are distributed sufficiently far apart from each other to permit the inflow and circulation of cooling air. The layout of such systems leads to a large power supply size, which in turn limits the mobility of the power supply. Often, the power supply must be transported with other equipment to the worksite or carried by hand, and a large, bulky, or heavy power supply is more difficult to transport. Furthermore, a layout in which internal components are spaced apart to promote circulation leads to more complicated manufacturing and repair procedures, as most internal components must be separately mounted to the power supply framework and hardwired into the device. Such designs lead to extra system costs because of the additional manufacturing and wiring required, and to extra repair costs because of the additional time required to identify and replace failed or defective internal components. Additional costs also result because the complexity of such systems requires additional repair time during which the system is not useable. It is therefore desirable that the power supply be capable of maintaining a sufficiently low operational temperature while minimizing power supply size and having a simplified component layout.

Yet another factor considered in the selection and design of a power supply is the environment in which the power supply will be used. Welding and cutting operations can be performed in a wide variety of environments and harsh conditions, such as outdoors, in high humidity or rain, and in atmospheres that contain corrosive, conductive, potentially flammable, or other dust-type contaminates. Existing forced air cooling systems impel moisture and contaminated air through the power supply and, due in part to the distribution of heat-generating components in such systems, the entrained moisture and contaminants are distributed throughout the inside of the power supply. Over time, the moisture and contaminants affect and/or accumulate upon component surfaces within the power supply, eventually reducing the ability of those components to remove excessive heat and possibly corroding or otherwise degrading the performance of the components or cause electrical shorting of components. It is therefore desirable that the power supply be capable of operating in a wide variety of environments at operational temperature while minimizing the exposure of internal components to moisture and other environmental contaminants.

In view of the foregoing, what is needed is a cooling system for a power supply that has low system and operational costs, is capable of maintaining an operational temperature within certain boundaries, has minimal size and a simplified design, and is capable of performing in a variety of environments while minimizing the entry of moisture and contaminants into the power supply. A first object of the invention is to provide a power supply that operates efficiently at low operational cost while also being affordable to purchase and maintain. Another object of the invention is to provide a power supply that is capable of maintaining an operational temperature while simultaneously minimizing power supply size and promoting a simplified component layout. Yet another object of the invention is to provide a power supply capable of operating in a wide variety of environments at reasonable operational temperatures while minimizing the exposure of internal components to moisture and other environmental contaminants.

SUMMARY OF THE INVENTION

In a first aspect of the invention, a cooling system for a power supply can include a heat sink that can have a base and a plurality of fins extending from the base, and each fin can have an outer fin edge. The plurality of fins can form at least one channel between adjacent fins, and the at least one channel can have a central portion and an end portion, and the end portion can correspond to an end of the heat sink. A panel can be disposed along the outer fin edges of the adjacent fins to at least partially enclose the at least one channel, and the panel can extend from the central portion to at least a midpoint of the end portion. A fan can be aligned with the heat sink that can direct a gas flow to the central portion, and at least a portion of the gas flow can exit the at least one channel at the end portion. Embodiments can include a direction of the gas flow to the central portion that can be redirected in a different direction. The direction of the gas flow to the central portion can be at approximately a right angle to a direction of the portion of the gas flow that can exit at the end portion. The fan can direct another gas flow in a direction away from the central portion. At least a portion of the panel can extend to the end of the heat sink. At least a portion of the gas flow can exit from the end of the heat sink. At least one channel can have another end portion and at least a portion of the gas flow can exit the at least one channel at the another end portion. The central portion can be disposed between the end portion and the another end portion. The gas flow to the central portion can be cooler than the gas flows that can exit at the end portions. The central portion can be in an approximate middle section of the power supply. The gas flow can enter a side of the power supply and can exit at another side of the power supply, and the side and another side can be adjacent to each other. A plurality of electrical components can be in thermal contact with the heat sink. The plurality of electrical components can include at least one of a resistor, a silicon power device, or a magnetic device. At least a portion of the gas flow can be constricted in a majority of the at least one channel.

In a second aspect of the invention, a method of cooling a power supply can include forming a heat sink in the power supply, the heat sink can have a base and a plurality of fins extending from the base and each fin can have an outer fin edge. The plurality of fins can form at least one channel between adjacent fins, and the at least one channel can have a central portion and an end portion that can include an end of the heat sink. A panel can be positioned along the outer fin edges of the adjacent fins that can at least partially enclose the at least one channel, and the panel can extend from the central portion to at least a midpoint of the end portion. A gas flow can be directed via a fan to the central portion, and at least a portion of the gas flow can exit the at least one channel disposed at the end portion.

In a third aspect of the invention, a cooling system for a power supply can include at least one gas passage that can be enclosed by one or more walls and can extend through the power supply from an approximate middle portion of the power supply to at least one side of the power supply. The at least one gas passage can have a central portion that can be disposed at the middle portion and can have an end portion that can be disposed near the at least one side. A fan can direct a gas flow to a passage that can be located in or formed by the at least one gas passage that can be disposed at the central portion. Gas entering the passage entrance can be directed through the at least one gas passage to an exit passage that can be disposed at the end portion of the at least one gas passage. Embodiments include a direction of the gas flow to the passage entrance that can be redirected in a different direction. A direction of the gas flow to the passage entrance can be at approximately a right angle to a direction of the gas flow that can be directed through the at least one gas passage. The cooling system can have at least two of the at least one gas passages, and the central portion can be disposed between the at least two gas passages. The gas flow to the passage entrances can be cooler than the gas flows that can exit at passage exits. The central portion can be in an approximate middle section of the power supply. The gas flow can enter a side of the power supply and can exit at another side of the power supply, and the side and another side can be adjacent to each other. A plurality of electrical components can be in thermal contact with the one or more walls. The plurality of electrical components can include at least one of a resistor, a silicon power device, or a magnetic device. The at least a portion of the gas flow can be constricted in a majority of the at least one gas passage.

In a fourth aspect of the invention, a method of cooling a power supply can include forming in the power supply at least one gas passage that can be enclosed by one or more walls and can extend through the power supply from an approximate middle portion of the power supply towards at least one side of the power supply. The at least one gas passage can have a central portion that can be disposed at the middle portion and can have an end portion that can be disposed near the at least one side. A gas flow can be directed to a passage entrance of the at least one gas passage at the central portion. Gas entering the passage entrance can be directed through the at least one gas passage to a passage exit of the at least one gas passage at the end portion.

In a fifth aspect of the invention, a power supply can include a fan that can direct a gas flow through an inlet port that can be disposed in an inlet side of the power supply. One or more gas outlet ports can be disposed in one or more adjacent sides of the power supply, the one or more adjacent sides can be adjacent to the inlet side, and at least a portion of the gas flow can exit the power supply through the one or more gas outlet ports. A majority of the gas flow can pass through at least one heat sink passage that can be disposed in a heat sink. The at least one heat sink passage can be enclosed by at least one wall within the heat sink for a majority of a length of the at least one heat sink passage. Embodiments include a cooling system in which a majority of the gas flow can enter the gas inlet port and can be redirected in one or more directions that can correspond to the one or more gas outlet ports. A majority of the gas flow can enter the gas inlet port and can be redirected in one or more directions that can be different than an inflow direction that can flow into the gas inlet port. A direction of the gas flow into the gas inlet port can be at approximately a right angle to a direction of the at least a portion of the gas flow that can exit the power supply. The cooling system can have at least two of the at least one heat sink passage, and a portion of the majority of the gas flow can enter each of the at least two heat sink passages at an approximate middle portion of the heat sink that can be disposed between the at least two heat sink passages. The portions of the gas flow that can enter the at least two heat sink passages can be cooler than the portions of the gas flow that can exit the power supply. The gas inlet port can disposed in an approximate middle of the inlet side. The fan can direct the gas flow to a point inside the power supply that can be disposed between two of the one or more adjacent sides of the power supply. A plurality of electrical components can be in thermal contact with the heat sink. The plurality of electrical components can include at least one of a resistor, a silicon power device, or a magnetic device. The gas flow that can pass through the at least one heat sink passage can be constricted by a majority of the at least one heat sink passage. The gas flow can be an airflow.

In a sixth aspect of the invention, a method of cooling a power supply can include disposing a gas inlet port in an inlet side of the power supply. A gas flow can be directed using a fan through the gas inlet port into the power supply. At least a portion of the gas flow can be directed through and out of the power supply via one or more gas outlet ports in one or more adjacent sides of the power supply. The one or more adjacent sides can be adjacent to the inlet side. A majority of the gas flow can pass through at least one heat sink passage that can be disposed in a heat sink, and the at least one heat sink passage can be enclosed by at least one wall for a majority of a length of the at least one heat sink passage.

In a seventh aspect of the invention, a cooling system for a power supply can include a first section of the power supply can contain a plurality of electrical components. A second section of the power supply can receive a majority of a gas flow that can be directed into the power supply by a fan. The second section can direct the majority of the gas flow out of the power supply, and the second section can separate the majority of the gas flow from the electrical components. Embodiments include a first section that can be a clean section that can be less exposed than the second section to an environmental contaminant in the gas flow. The second section can be a dirty section that can be more exposed than the first section to an environmental contaminant in the gas flow. A direction of the gas flow that can be received into the second section can be redirected in a different direction. A direction of the gas flow that can be received into the second section can be at approximately a right angle to a direction of the gas flow that can be directed out of the power supply. The fan can direct another gas flow in a direction away from the second section. The second section can direct the majority of the gas flow out of the power supply in at least two directions, and a portion of the majority of the gas flow can be directed in each of the at least two directions. A portion of the second section that can receive the majority of the gas flow can be disposed between portions of the second section that can direct the majority of the gas flow out of the power supply. A gas flow in the portion that can receive the majority of the gas flow can be cooler than gas flows in the portions that can direct the majority of the gas flow out of the power supply. A portion of the second section that can receive the majority of the gas flow can be disposed in an approximate middle section of the power supply. The gas flow can enter a side of the power supply and can exit at another side the power supply, and the side and another side can be adjacent to each other. The second section can be formed to have at least one wall, and a plurality of electrical components can be in thermal contact with the at least one wall. The plurality of electrical components can include at least one of a resistor, a silicon power device, or a magnetic device. A majority of the second section can constrict the majority of the gas flow.

In an eighth aspect of the invention, a method of cooling a power supply can include forming a first section within the power supply that can contain a plurality of electrical components. A second section can be formed within the power supply that can receive a majority of a gas flow that can be directed by a fan into the power supply, and the second section can direct the majority of the gas flow out of the power supply. The second section can separate the majority of the gas flow from the plurality of electrical components.

In a ninth aspect of the invention, a cooling system for a power supply can include a section of the power supply that can channel a majority of a gas flow that can be directed by a fan into the power supply through and out of the power supply. The section can shield a plurality of electrical components from the majority of the gas flow. Embodiments include a section that can receive the majority of the gas flow in a direction and that can channel the majority of the gas flow in a different direction. A direction of the gas flow that can be received into the section can be at approximately a right angle to a direction of the gas flow that can be channeled out of the power supply. The fan can direct another gas flow in a direction away from the section. The section can channel the majority of the gas flow out of the power supply in at least two directions, and a portion of the majority of the gas flow can be directed in each of the at least two directions. A portion of the section that can receive the majority of the gas flow can be disposed between portions of the section that can channel the majority of the gas flow out of the power supply. A gas flow in the portion that can receive the majority of the gas flow can be cooler than gas flows in the portions that can channel the majority of the gas flow out of the power supply. A portion of the section that can receive the majority of the gas flow can be disposed in an approximate middle section of the power supply. The gas flow can enter a side of the power supply and a portion of the majority of the gas flow can exit at another side of the power supply, and the side and another side can be adjacent to each other. The section can be formed to have at least one wall, and a plurality of electrical components can be in thermal contact with the at least one wall. The plurality of electrical components can include at least one of a resistor, a silicon power device, or a magnetic device. A majority of the section can constrict the majority of the gas flow.

In an eleventh aspect of the invention, a method of cooling a power supply can include forming within a power supply a section of the power supply that can be capable of channeling a majority of a gas flow that can be directed into the power supply by a fan through and out of the power supply. The section can shield a plurality of electrical components that can be disposed in the power supply from the majority of the gas flow.

In a twelfth aspect of the invention, a cooling system for a power supply can include a section that can be disposed within the power supply that can receive a majority of a gas flow that can be directed into the power supply by a fan. The section can direct the majority of the gas flow out of the power supply, and the section can be substantially devoid of electrical components. Embodiments include a section that can receive the majority of the gas flow in a direction and that can direct the majority of the gas flow in a different direction. A direction of the gas flow that can be received into the section can be at approximately a right angle to a direction of the gas flow that can be directed out of the power supply. The fan can direct another gas flow in a direction away from the section. The section can direct the majority of the gas flow out of the power supply in at least two directions, and a portion of the majority of the gas flow can be directed in each of the at least two directions. A portion of the section that can receive the majority of the gas flow can be disposed between portions of the section that can direct the majority of the gas flow out of the power supply. A gas flow in the portion that can receive the majority of the gas flow can be cooler than gas flows in the portions that can direct the majority of the gas flow out of the power supply. A portion of the section that can receive the majority of the gas flow can be disposed in an approximate middle section of the power supply. The gas flow can enter a side of the power supply and a portion of the majority of the gas flow can exit at another side of the power supply, and the side and another side can be adjacent to each other. The section can be formed to have at least one wall, and a plurality of electrical components can be in thermal contact with the at least one wall. The plurality of electrical components can include at least one of a resistor, a silicon power device, or a magnetic device. A majority of the section can constrict the majority of the gas flow. The gas flow can be an airflow.

In a thirteenth aspect of the invention, a method of cooling a power supply can include forming a section within the power supply that can receive a majority of a gas flow that can be directed into the power supply by a fan. The section can direct the majority of the gas flow out of the power supply, and the section can be substantially devoid of electrical components.

In a fourteenth aspect of the invention, a method of assembling a power supply can include mounting a plurality of heat-generating components to a single circuit board. The mounted heat-generating components can be thermally connected to a heat sink. Embodiments include mounting at least one of a resistor, a silicon power device, or a magnetic device to the single circuit board.

In a fifteenth aspect of the invention, a power supply can include a thermally-conductive plate that can have a first surface, a second surface that can be opposed to the first surface, and edges that can be located about a periphery of the plate. A plurality of heat-generating components can be mounted on the first surface of the plate. The plate can be disposed between the plurality of heat-generating components and a wall of an enclosure surrounding the power supply. The plate can be disposed to maintain a gap between the second surface and the wall, and the gap can facilitate a gas flow around an exposed surface area of the plate. Embodiments include a plurality of heat-generating components that can include at least one of the following: an inductor, a transformer, or an electromagnet. The plurality of heat-generating components can include a thermally-conductive electrical polymer, e.g., between the thermally conductive components and the electrically-conductive components. The gas flow can be an airflow.

In a sixteenth aspect of the invention, a method of assembling a power supply can include positioning in the power supply a thermally-conductive plate that can have a first surface, a second surface that can be opposed to the first surface, and edges that can be located about a periphery of the plate. A plurality of heat-generating components can be mounted on the first surface of the plate. The plate can be disposed between the plurality of heat-generating components and a wall of an enclosure surrounding the power supply. The plate can be positioned to maintain a gap between the second surface and the wall. The gap can facilitate a gas flow around an exposed surface area of the plate.

In a seventeenth aspect of the invention, a power supply can include a panel that can be positioned in a center location of the power supply. The panel can approximately bisect the power supply relative to a vertical axis that can extend therethrough. A heat sink can be positioned within the power supply and can be mounted to the panel, and the panel and heat sink together can form a mounting structure. A plurality of components can be connected to the mounting structure, and a power supply enclosure an surround the mounting structure. Embodiments include a plurality of components that can include at least one of a carrying handle for the power supply, an inductor, a transformer, an electromagnet, a resistor, a silicon power device, or a magnetic device. The enclosure can include at least two end panels, a base, and a cover.

In an eighteenth aspect of the invention, a method of assembling a power supply can include positioning a panel at a central location within the power supply. The panel can at least substantially bisect the power supply relative to a vertical axis that can extend therethrough. A heat sink can be mounted to the panel, and the panel and heat sink together can form a mounting structure. A plurality of components can be connected to the mounting structure, and a power supply enclosure can be connected to the mounting structure.

In a nineteenth aspect of the invention, an electromagnetic component of a power supply can include a core that can have a length with a first end and a second end. A plurality of windings can be disposed around the core, and the first end can include a surface that can be adapted to engage a surface of a heat sink that can be disposed in the power supply, and the core can be thermally connected to the heat sink. Embodiments include a component that can include at least one of the following: an inductor, a transformer, or an electromagnet. The component can include a thermally-conductive electrical polymer. The first end can be formed to have a planar surface that can engage a mating planar surface of the heat sink. The component can abut at least a portion of a circuit board, and the component can be electrically connected to the circuit board.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Reference will now be made in detail to embodiments of the invention, one or more examples of which are illustrated in the figures. Each embodiment described or illustrated herein is presented for purposes of explanation of the invention, and not as a limitation of the invention. For example, features illustrated or described as part of one embodiment can be used with another embodiment to yield still a further embodiment. It is intended that the present invention include these and other modifications and variations as further embodiments.

By well known methods, a power supply provides power to a welding or plasma cutting system through a cable. As shown in FIGS. 1-4, the power supply 10 includes well known connectors 12 that can connect the power supply 10 to the cable (not shown), to a power source such as line voltage (not shown), and to additional hoses (not shown) used to supply one or more gases to the system.

As shown in FIGS. 1-5, the invention includes power supplies in which the exterior of the power supply (ends 14 and cover 16) includes ports 18 for the ingress and egress of a cooling gas, which can be air. Air is identified as the gas in this description but it is understood that another gas or a mixture of air and another gas could be used to cool the power supply 10. An inlet 18a provides a port through which air enters the power supply 10, and outlets 18b provide ports through which air can exit the power supply 10. The inlet 18a and outlets 18b include louvers partially covering the ports. The power supply 10 can comprise an enclosure including ends 14, a base 20, and cover 16. Extending from the power supply 10 is a handle 22 for carrying the power supply. In an embodiment with a larger power supply, the base 20 may include wheels (not shown) to moveably support the power supply.

Figure 1:
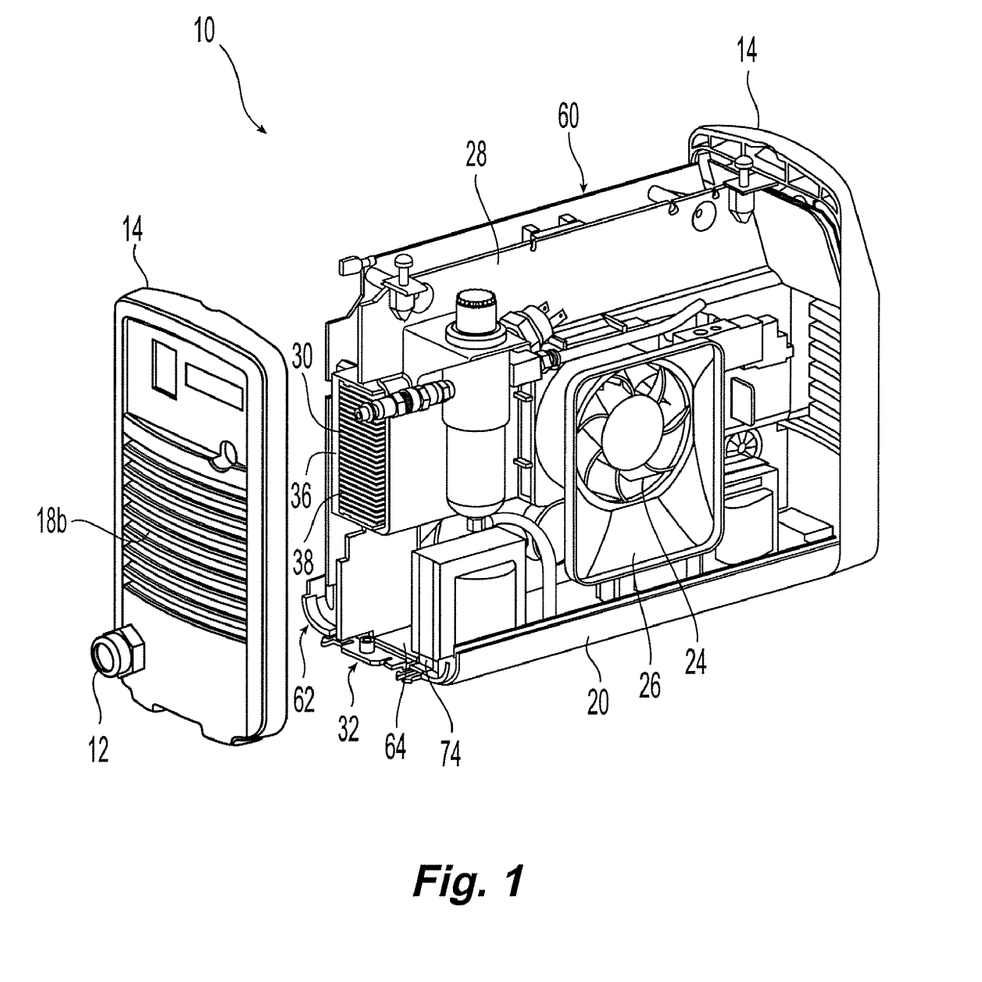
FIG. 1 is a perspective view of a power supply configuration with the enclosure, handle, and one end panel removed to provide detail regarding internal components.
Figure 2:
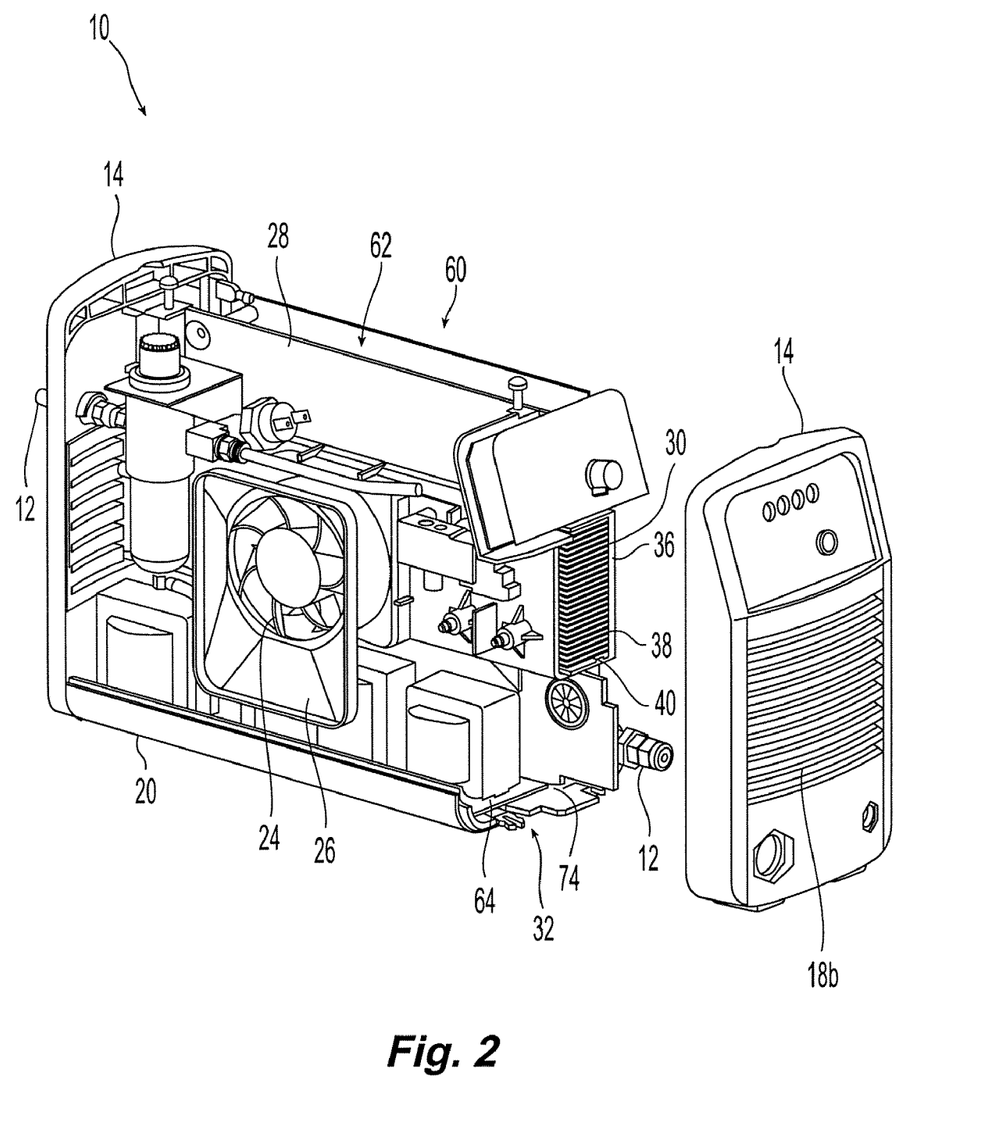
FIG. 2 is an alternative view of FIG. 1 with the opposite end panel removed.
Figure 3:
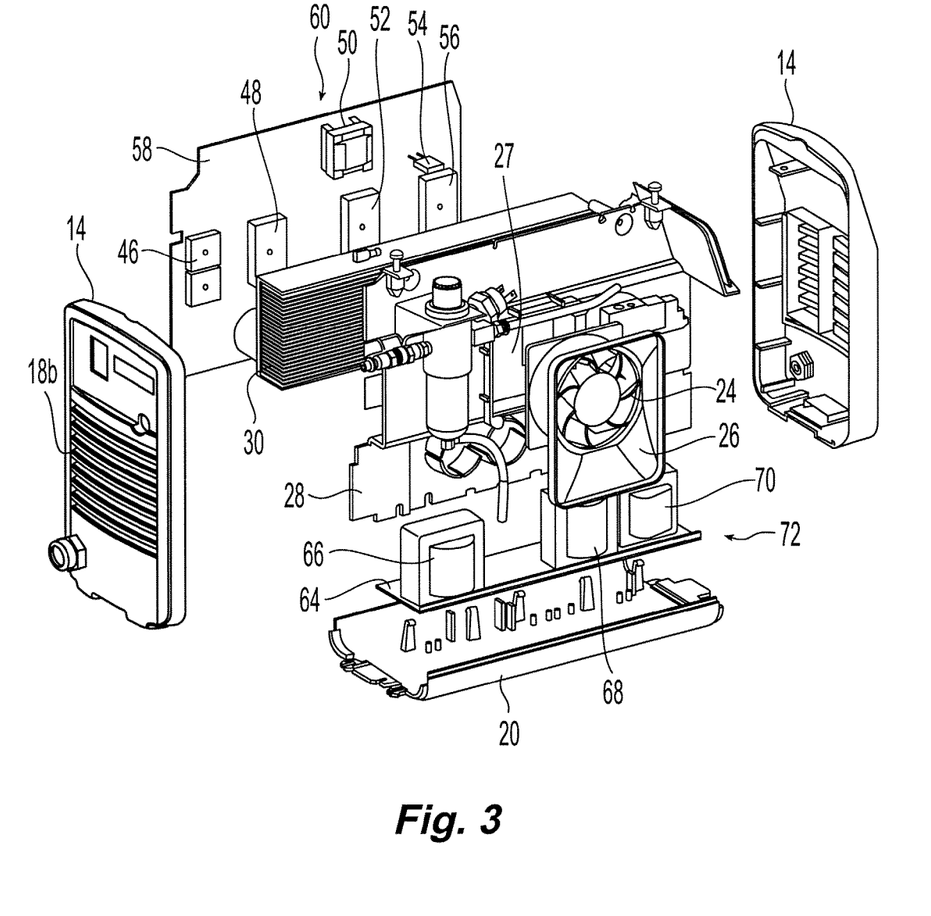
FIG. 3 is an exploded view of the power supply configuration of FIG. 1.
Figure 4:
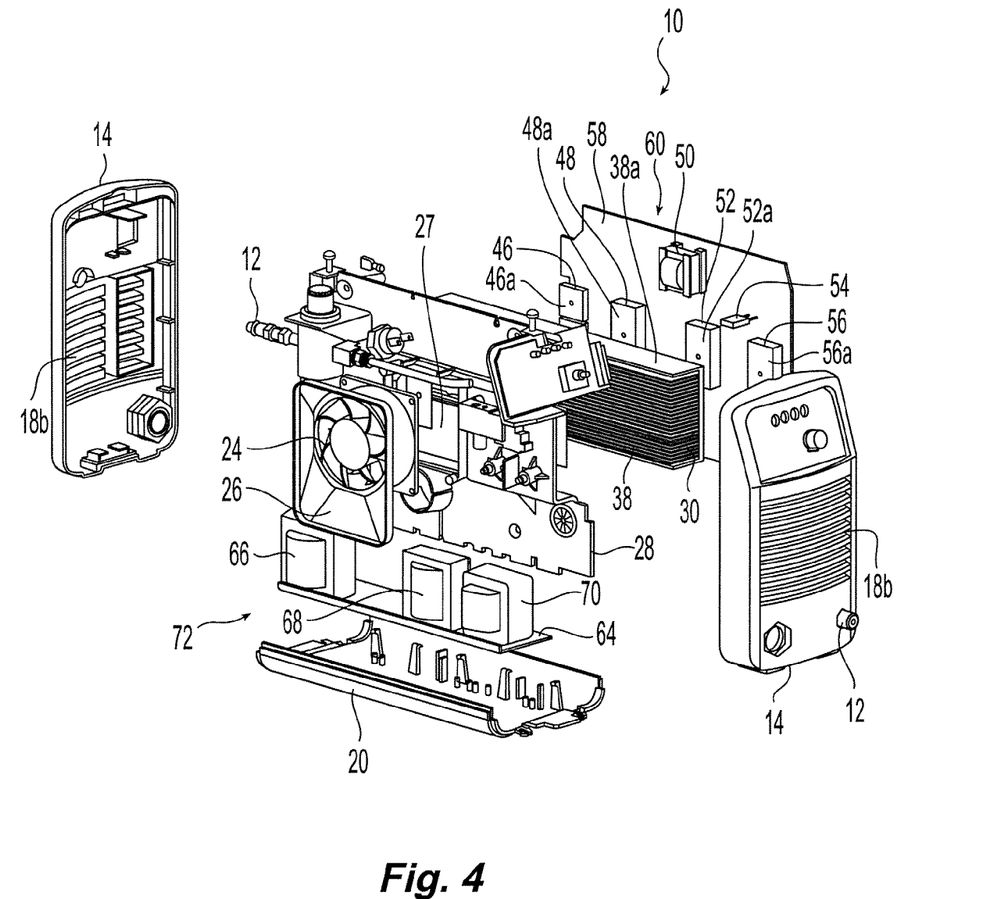
FIG. 4 is an alternative exploded view of FIG. 3.
Figure 5:
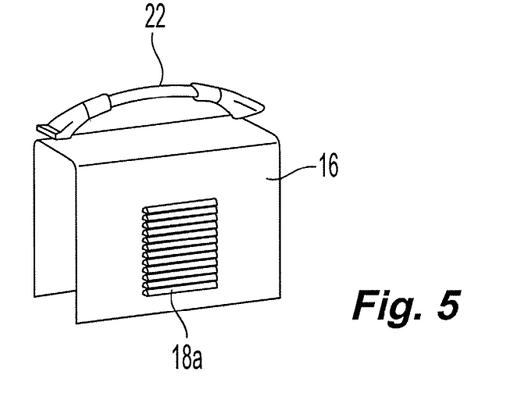
FIG. 5 is a view of the power supply enclosure and handle removed from FIGS. 1-4.
Figure 8:
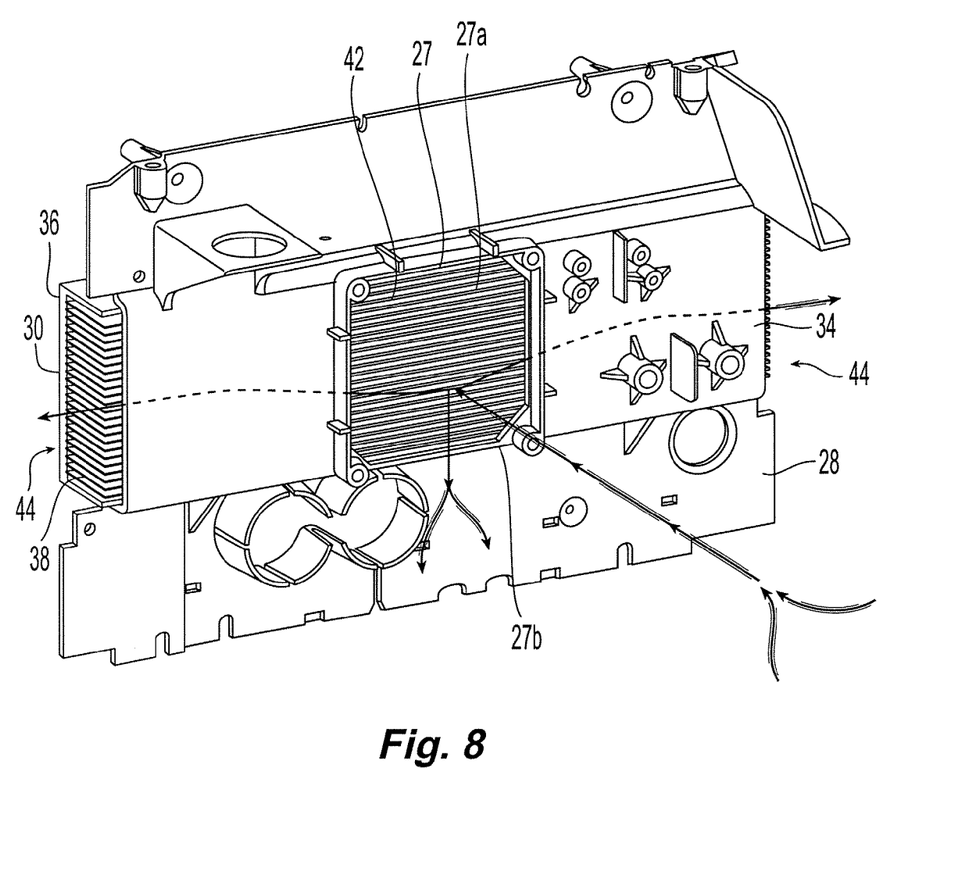
FIG. 8 is a view of the panel and heat sink assembly of the preferred embodiment of the invention.

FIGS. 1-2 illustrate an assembled view and FIGS. 3-4 illustrate an exploded view of the power supply 10 of the preferred embodiment. The power supply 10 includes a fan 24 that draws air into the power supply 10 through the inlet 18a. Surrounding the fan 24 is a plenum 26 having a generally tubular shape and directing the air flowing through the fan 24 between ports at each end of the plenum 26. One end of the plenum 26 can flare out to a greater cross sectional dimension, and can abut the inside surface of the inlet 18a to receive the air passing through the inlet. The other end of the plenum 26 can extend to abut against a port 27 within a panel 28 disposed against the side of a heat sink 30. The inlet-facing end of the plenum 26 directs the air entering the plenum into the fan 24. The heat-sink facing end of the plenum 26 directs the air passing through the fan 24 into the port 27. As shown in FIG. 8, the port 27 can have one or more main ports 27a and a slit port 27b. The main port 27a directs a majority of the air passing through the fan 24 to the side of the heat sink 30. The slit port 27b allows a small portion of the air passing through the fan 24 to be directed into an internal compartment 32 of the power supply, away from the heat sink 30. Preferably, the air entering the internal compartment 32 exits through outlets 18b at the ends of the power supply 10.

Referring again to FIGS. 1-4, the panel 28 generally bisects the power supply 10, forming a vertical wall extending vertically between the base 20 of the power supply to the top, and horizontally between the ends 14 of the power supply. The port 27 is disposed in approximately the center of the panel 28, and joins the heat-sink side of the plenum 26 to the side of the heat sink 30. The port 27 thus provides a passage through which a majority of the air impelled by the fan 24 enters the heat sink 30. As shown in FIG. 8, the panel 28 is formed to have an offset portion 34 conforming to the shape of the heat sink 30. The offset portion 34 can be shaped to receive at least a portion of the heat sink 30, thereby promoting the improved air flow characteristics of the invention. Moreover, the offset portion 34 allows both the panel 28 and the heat sink 30 to be centrally disposed in the power supply 10. The panel 28 is preferably made of a metal or another thermally-conductive material to promote heat dissipation. As illustrated, the panel forms a central support structure for the power supply, providing support for the heat sink and a plurality of components, described in detail below, which can be attached to the combined panel 28 and heat sink 30. The panel can also connect to and provide support for the base 20, ends 14, cover 16, and handle 22.

Figure 7:
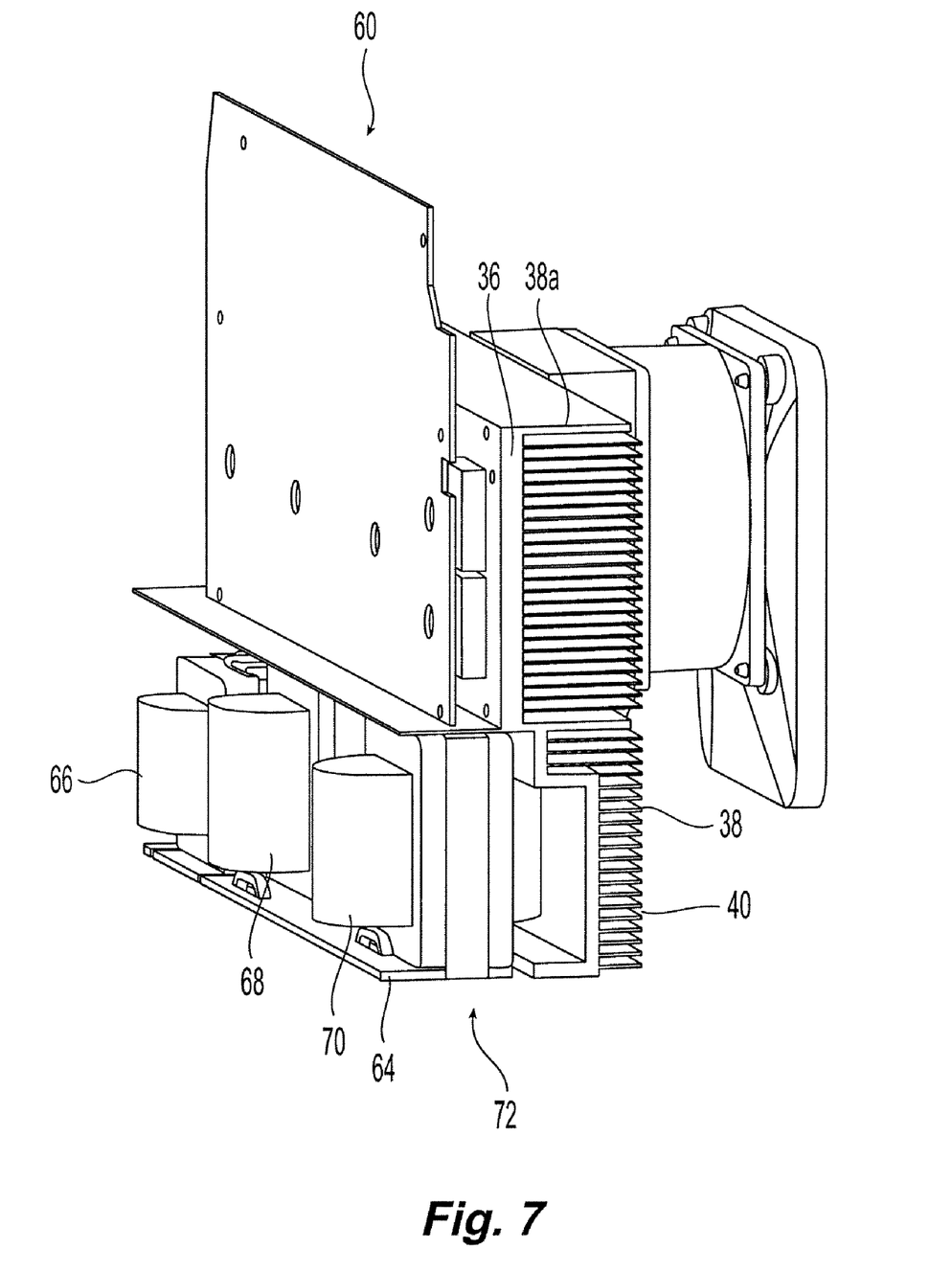
FIG. 7 is a view of the internal components of the power supply, showing an alternative embodiment for the arrangement an extended heat sink, the power board, and components.

The illustrated heat sink 30 has a base 36 and fins 38 extending from the base 36. The heat sink 30 also has a length extending between the ends 14 of the power supply, and the middle of the heat sink 30 is disposed in approximately the middle of the power supply, with the ends of the heat sink 30 disposed in approximately the middle of the ends of the power supply 10. Between adjacent fins 38, channels 40 can extend the length of the heat sink 30. The heat sink is preferably extruded or assembled from a metal, but can also be made of a ceramic or other material capable of transferring heat from the base to the fins. In the preferred embodiment, the heat sink 30 extends the entire length of the power supply 10, from one end to the other end. However, in an alternative embodiment, the heat sink can extend within only a portion of the power supply, or extend from the middle of the power supply to only one end of the power supply. In some embodiments, the heat sink is comprised of several smaller heat sinks that can be positioned near each other. These can also extend in multiple directions, such as in three directions extending from the middle of the power supply towards both ends and the top of the power supply. As shown in FIG. 7, the heat sink can also extend below the plenum 26.

In a preferred embodiment, a portion of the offset portion 34 of the panel 28 is disposed against the outer edges of the heat sink fins 38. The channels 40 between the fins 38 can thus be enclosed to form a series of tubes along the length of the heat sink 30, with each tube having a rectangular cross-section bounded by walls formed from the base 36, adjacent fins 38, and panel 28. In an alternative embodiment, the offset portion 34 of the panel 28 can be formed to abut the sides or edges of only the outermost fins 38a of the heat sink 30 without abutting the internal fins disposed inside the heat sink, thus forming a single tube bounded by walls formed from the entire heat sink base 36, the outermost fins 38a, and the panel 28. In such embodiments, the internal fins of the heat sink do not form a part of a wall of the tube. In yet another alternative embodiment (not shown), the heat sink can comprise two heat sinks with fin edges abutting each other to form one or more tubes bounded by walls that are formed from the bases and fins of each heat sink, without the need to employ a panel. In some embodiments, the panel 28 is disposed along the heat sink 30 from the middle of the heat sink to the ends of the heat sink, forming in each tube an entrance port 42 in the middle of the heat sink and an exit port 44 at the end of the heat sink, as illustrated in FIG. 8.

The majority of the air entering the power supply 10 and impelled by the fan 24 can enter the side of the heat sink 30 through the main port 27a. A small portion of the air passes through the slit port 27b. In a preferred embodiment, the air entering the heat sink 30 is directed in another direction after entering the heat sink, and is made to move in a new direction at approximately a right angle to the direction of the air passing through the fan, e.g., as illustrated in FIG. 8. In an alternative embodiment (not shown), the air can be directed to move is a different direction that is at an acute angle, an obtuse angle, or both, compared to the direction of the air passing through the fan.

The air entering the heat sink 30 can be directed by each tube to the end of the tube at the end of the heat sink. As illustrated, the exit port 44 of each passage abuts the outlets 18b of the power supply and vents the majority of the air impelled by the fan 24 to the outside environment. A majority of the air flowing through the power supply thus contacts only the plenum 26, fan 24, and the inside of each tube, without contacting any electrical components contained within the power supply 10. Furthermore, most of the moisture and/or contaminants entering the power supply with the air being supplied through the inlet port 18a is vented out of the power supply without contacting any electrical components. In this embodiment, this moisture and contaminants have contact with no more than the plenum 26, fan 24, panel 28, and heat sink 30. The passages formed in the heat sink 30 can at least partially restrict the air passing through the heat sink, causing a pressure drop and a resultant increase in air flow velocity. The cooling mechanism of the heat sink can thus be enhanced by the increased flow of air through the heat sink, thereby permitting a greater cooling effect than is achieved with a heat sink that does not have a panel 28 that forms passages with heat sink channels 40. The improved cooling effect also permits a denser, more compact arrangement of components within the power supply 10 because heat-generating parts can be positioned more closely to the centrally disposed heat sink 30.

The power supply can include a plurality of electrical components. As shown in FIGS. 3 and 4, these components can include an input bridge 46, a PFC module 48, a flyback transformer 50, an inverter module 52, an output snubber resistor 54, and/or an output module 56. These components can also include a resistor, a silicon power device, and/or a magnetic device. Preferably, these electrical components are physically mounted to and in electrical communication with a single or common power board 58, thereby forming a power board assembly 60. The power board assembly 60 can be preassembled before installation in the power supply 10. Due to the direct connection with the power board 58, the electrical components 46-56 can be electrically connected to the power supply 10 without wires, thus simplifying the design by the elimination of this wiring. Assembly and repair costs are also minimized by reducing the time required to connect each of these components to the power board, as compared to previous power supply designs. As shown in FIG. 4, at least some of the components of the power board assembly 60 include surfaces 46a, 48a, 52a, and 56a facing the heat sink 30 that are planarized to allow direct contact with the base 36 of the heat sink 30. The planarized surfaces 46a, 48a, 52a, and 56a can abut the planar base 36 of the heat sink 30, establishing direct thermal contact, thereby using direct conductive heat transfer with the heat sink 30 to cool the component and the power board assembly 60. In an assembly or repair procedure, the preassembled power board assembly 60 can be connected as a unitary piece to the heat sink 30. In an alternative embodiment (not shown), the power board assembly can be composed of two or more boards electrically connected together to form an operable single board. In a preferred embodiment, e.g., as shown in FIGS. 1 and 2, the power board assembly 60 is disposed in a section 62 of the power supply 10 that is physically separated and shielded from, and not exposed to, the air passing through the fan 24 or heat sink 30, or to the air that enters through the inlet 18a.

By locating at least some of the electrical components in portions of the power supply that are separated and/or shielded from the airflow impelled by the fan 24, the components can be cooled indirectly by the airflow, by direct thermal conduction through the heat sink 30, and can be protected from any moisture or contaminants entrained in the cooling air flow. Accordingly, the power supply 10 includes a clean area 62 that is not exposed to the airflow entering the power supply 10. Thus, a clean section of the internal compartment 32 is not exposed to the air passing through the heat sink 30, and a dirty section inside heat sink 30 is exposed to the majority of the airflow passing through the power supply. In the illustrated embodiment, no electrical components (other than the fan 24) are located in the portion of the power supply that is exposed to the majority of the airflow that passes through the power supply. In another embodiment (not shown), the clean section of the internal compartment 32 can include minor electrical components, such as a temperature sensor or a air speed sensor.

The power supply 10 can also include a plate 64 to which are mounted the PFC inductor 66, the power transformer 68, and the output inductor 70 which forms a coil assembly 72. The plate 64 can be made of metal or of a heat-conductive material. Preferably, the coil assembly 72 is preassembled as a single unit that is installed in the internal compartment of the power supply. The coil assembly 72 can be connected to the bottom portion of the panel 28. As illustrated, the plate 64 of the coil assembly 72 is also connected to the inside surface of the power supply base 20, and is separated from the inside surface of the base 20 by a gap 74. A feature of this design is that the small portion of air passing through the slit port 27b circulates around the compartment 32 and provides cooling to the surfaces of the coil assembly 72.

Figure 6:
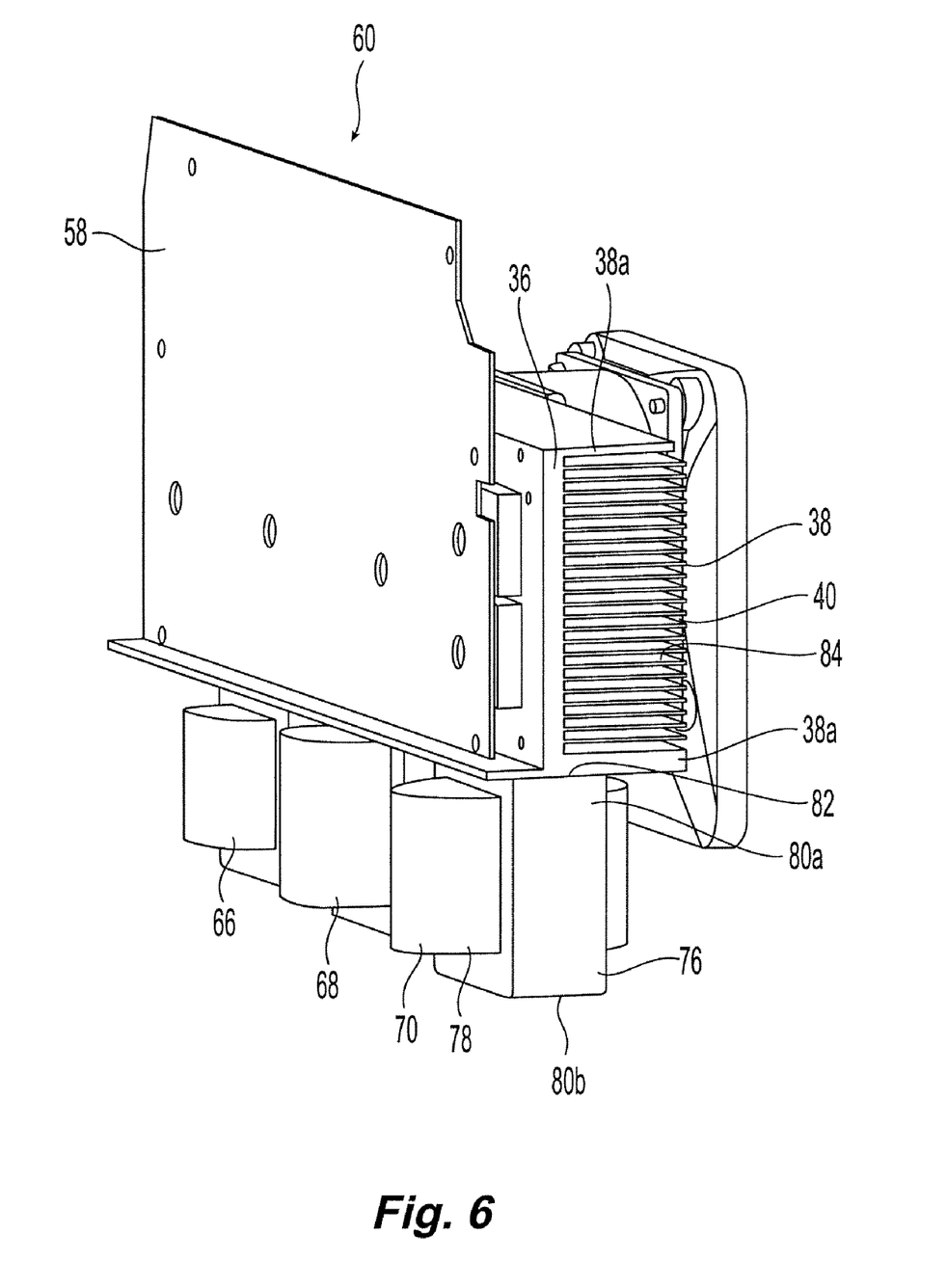
FIG. 6 is a view of the internal components of the power supply, showing an alternative embodiment for the arrangement the heat sink, power board, and components.

As shown in FIG. 6, in another embodiment of the invention, each of the components 66, 68, and 70 include, e.g., a core 76 and windings 78 to form an electromagnet structure. The core 76 is constructed of a ferromagnetic material or of another magnetically permeable material, with the core 76 extending from the electromagnetic structure to form two ends 80a, 80b. The core 76 is preferably composed of a powder material mixed with a thermally-conductive binder, which is formed into a final shape with a mould. The powder material can be a Powder Iron Type made by Micrometals, Inc. of Anaheim, Calif., or Kool Mn made by Magnetic, Inc. of Pittsburgh, Pa. The thermally-conductive binder enhances the conduction of thermal energy away from the core, and is preferably a polymer such as CoolPoly® D-Series Thermally Conductive Plastic made by Cool Polymers, Inc. of Warwick, R.I.

One end 80a of the core 76 can be formed to have a planar surface 82, and is preferably disposed to have direct thermal contact to a planar surface of the heat sink 84. In yet another embodiment (not shown), the components 66, 68, and 70 are disposed to contact the power board assembly 60 and to be electrically connected directly to the power board 58, thereby eliminating the need for wires for these components.

While the invention has been particularly shown and described with reference to specific preferred embodiments, it should be understood by those skilled in the art that various changes in form and detail can be made therein without departing from the spirit and scope of the invention as defined by the appended claims.

We claim:

1. A power supply of a welding or plasma cutting system, comprising:

a panel positioned in a center location of the power supply, the panel approximately bisecting the power supply relative to a vertical axis extending therethrough;

a heat sink positioned within the power supply and mounted to the panel, the panel and heat sink together forming a mounting structure;

a first plurality of components connected to the mounting structure;

a power supply enclosure surrounding the mounting structure and comprising a wall;

a thermally-conductive plate having a first surface and a second surface opposed to the first surface; and a plurality of heat-generating components mounted on the first surface of the plate, wherein the plate is disposed between the plurality of heat-generating components and the wall of the power supply enclosure, the plate being disposed to maintain a gap between the second surface and the wall, the gap facilitating a gas flow around an exposed surface area of the plate.

2. The power supply of claim 1, wherein the first plurality of components includes at least one of a carrying handle for the power supply, an inductor, a transformer, an electromagnet, a resistor, a silicon power device, or a magnetic device.

3. The power supply of claim 1, wherein the enclosure includes at least two end panels, a base, and a cover.

4. The power supply of claim 1, wherein the plurality of heat-generating components includes at least one of the following: an inductor, a transformer, or an electromagnet.

5. The power supply of claim 1, wherein the plurality of heat-generating components includes a thermally-conductive electrical polymer.

6. The power supply of claim 1, wherein the gas flow is an airflow.

7. The power supply of claim 1, wherein the plate is connected to the panel.

8. The power supply of claim 1, wherein an edge located about a periphery of the plate is connected to the wall.

9. The power supply of claim 1, wherein the plurality of heat-generating components further comprises an electromagnetic component including:
    a core having a length with a first end and a second end; and
    a plurality of windings disposed around the core,
    wherein the first end includes a surface adapted to engage a surface of the heat sink, the core being thermally connected to the heat sink.

10. The power supply of claim 9, wherein the electromagnetic component comprises at least one of the following: an inductor, a transformer, or an electromagnet.

11. The power supply of claim 9, wherein the electromagnetic component comprises a thermally-conductive electrical polymer.

12. The power supply of claim 9, wherein the first end is formed to have a planar surface that engages a mating planar surface of the heat sink.

13. The power supply of claim 9, wherein the electromagnetic component abuts at least a portion of a circuit board, the electromagnetic component electrically connected to the circuit board.

14. A method of assembling a power supply of a welding or plasma cutting system, comprising:
    positioning a panel at a central location within the power supply, the panel at least substantially bisecting the power supply relative to a vertical axis extending therethrough;
    mounting a heat sink to the panel, the panel and heat sink together forming a mounting structure;
    connecting a first plurality of components to the mounting structure;
    connecting a power supply enclosure having a wall to the mounting structure,
    positioning in the power supply a thermally-conductive plate having a first surface and a second surface opposed to the first surface; and
    mounting a plurality of heat-generating components on the first surface of the plate,
    wherein the plate is disposed between the plurality of heat-generating components and the wall of the power supply enclosure, the plate being positioned to maintain a gap between the second surface and the wall, the gap facilitating a gas flow around an exposed surface area of the plate.

* * * * *